(12) United States Patent
Barratt et al.

(10) Patent No.: US 7,866,398 B2
(45) Date of Patent: Jan. 11, 2011

(54) UMBILICAL TERMINATION ASSEMBLIES

(75) Inventors: Richard K. O. Barratt, Cypress, TX (US); Thomas D. Taylor, Spring, TX (US)

(73) Assignee: Vetco Gray Controls Limited, Nailsea, Bristol (GB)

( * ) Notice: Subject to any disclaimer, the term of this patent is extended or adjusted under 35 U.S.C. 154(b) by 0 days.

(21) Appl. No.: 12/228,467

(22) Filed: Aug. 13, 2008

(65) Prior Publication Data

US 2010/0038090 A1  Feb. 18, 2010

(51) Int. Cl.
*E21B 43/01* (2006.01)

(52) U.S. Cl. .................. 166/341; 166/343; 166/344; 166/345; 166/339; 166/347; 166/255.3; 405/158; 405/169; 405/172; 405/184.4

(58) Field of Classification Search .......... 166/343, 166/341, 339, 344, 347, 255.3, 345, 338; 405/158, 169, 172, 184.4
See application file for complete search history.

(56) References Cited

U.S. PATENT DOCUMENTS

| | | | | |
|---|---|---|---|---|
| 3,690,112 A * | 9/1972 | Pattison et al. | ............... | 405/169 |
| 4,541,753 A * | 9/1985 | Langner | ..................... | 405/166 |
| 4,717,287 A * | 1/1988 | Laursen | ....................... | 405/169 |
| 5,320,175 A * | 6/1994 | Ritter et al. | .................. | 166/339 |
| 5,807,027 A * | 9/1998 | Ostergaard | ................... | 405/170 |
| 5,890,841 A * | 4/1999 | Friis et al. | .................... | 405/170 |
| 6,481,504 B1 * | 11/2002 | Gatherar | ..................... | 166/344 |
| 6,742,594 B2 * | 6/2004 | Langford et al. | ............ | 166/350 |
| 2004/0226722 A1* | 11/2004 | Colyer et al. | ............... | 166/345 |
| 2005/0196243 A1* | 9/2005 | Pollock et al. | ........... | 405/224.3 |
| 2008/0286050 A1* | 11/2008 | DeLack | ...................... | 405/172 |

* cited by examiner

*Primary Examiner*—Thomas A Beach
*Assistant Examiner*—Matthew R Buck
(74) *Attorney, Agent, or Firm*—Bracewell & Giuliani LLP

(57) ABSTRACT

An underwater termination assembly for use with a subsea system such as a well tree, comprises a construction having first and second limbs substantially at a right-angle to each other, which construction may be lowered having an umbilical connected to one of the limbs so that said one of the limbs sits on the bed of a body of water.

15 Claims, 4 Drawing Sheets

UMBILICAL TERMINATION ASSEMBLIES

FIELD OF THE INVENTION

The present invention relates to umbilical termination assemblies.

BACKGROUND

Subsea systems such as well trees for subsea hydrocarbon extraction or injection wells, subsea manifolds and subsea distribution units are supplied with at least one of (for example) electric power, hydraulic power, control signals and chemicals via an umbilical, from a surface platform or surface vessel for example. The umbilical is terminated at the sea bed by an umbilical termination assembly (UTA). Typically, the UTA is mounted on a frame which in turn is attached to a foundation, normally a mudmat. Standard practice is to lower the mudmat to the sea bed first, whereupon it is installed at the required location so that the skirt of the mudmat penetrates the surface to provide lateral movement resistance and the top of the mudmat is level with the sea bed surface.

FIGS. 1a and 1b show, diagrammatically a method of installation of a UTA. In FIG. 1a, a frame 1 has been lowered to the sea bed attached to a mudmat 2. The next step is to lower the UTA 3, attached to an umbilical 4, and locate it on the frame 1. This is effected by a remotely operated vehicle (ROV), by aligning a pin (i.e. stab 5) with a funnel 6 connected to the frame. As shown in FIG. 1b, the UTA 3 is typically hinged at the top of stab 5, so that after location on the frame 1, continual laying of the umbilical 4 allows it to rotate from the vertical position to the horizontal as the umbilical 4 is laid on the sea bed. To complete the installation, appropriate links are then connected from a connector 8 on the UTA 3 to a subsea system (not shown) such as a well tree.

The above sequence of operations involves substantial use of an ROV, which is an expensive process. Furthermore, the mounting of the UTA on a foundation framework results in it being, typically, some six feet above the sea bed, resulting in the need for several bend restrictors 9 attached to the umbilical 4 between the UTA 3 and the point where the umbilical meets the sea bed.

SUMMARY OF THE INVENTION

The invention substantially reduces the work required by an ROV during the installation process by elimination of the need for a foundation framework with its stab and funnel and also eliminates, or at least reduces, the need for bend restrictors, thus making installation quicker and cheaper.

In one embodiment, the invention provides a UTA which is of a right-angle construction attached to and hinged at at least one foundation such as a mudmat such that the complete assembly can be lowered to the sea bed with an umbilical attached.

According to the present invention from one aspect, there is provided an underwater termination assembly for use with a subsea system, comprising a construction having first and second limbs at an angle (for example substantially a right-angle) to each other, one of the limbs being provided with at least one foundation (such as a mudmat), which construction may be lowered having an umbilical connected to said one of the limbs so that said one of the limbs sits on the bed of a body of water via said at least one foundation after it has been lowered to said bed.

Preferably, the construction is pivotally connected to said at least one foundation. In this case, said limbs may meet at an apex region of the construction, at which the region the construction is pivotally connected to said at least one foundation.

Said one of the limbs may be provided with at least one further foundation such as a mudmat, remote from said at least one foundation, via which the construction sits on the bed of a body of water after it has been lowered to said bed.

There may be a lift line connected to said construction (for example to said one of the limbs) for lowering the construction into a body of water. Alternatively, there could be a lift line connected to the at least one foundation via which lift line said construction may be lowered into a body of water.

The assembly could include such an umbilical, connected to said one of the limbs. In this case, said construction may be lowered into a body of water by said umbilical.

The construction may be provided with at least one connector for providing a link to a subsea system, such as a Christmas tree of a subsea well. In one example, the other of said limbs is provided with at least one such connector.

According to the invention from another aspect, there is provided a method of installing an underwater termination assembly for with a subsea system, the assembly comprising a construction having first and second limbs at an angle (for example, substantially a right-angle) to each other, one of the limbs being provided with at least one foundation such as a mudmat, the method comprising lowering the construction, with an umbilical connected to said one of the limbs, so that said one of the limbs sits on the bed of a body of water via said foundation after it has been lowered to said bed.

According to the present invention from a further aspect, there is provided an umbilical termination assembly for use with a subsea system, comprising a construction which is connected to at least one foundation such as a mudmat so that the construction can be lowered to the bed of a body of water, together with the at least one foundation, with an umbilical connected.

According to the present invention from yet a further aspect, there is provided a method of installing an umbilical termination assembly for use with a subsea system on the bed of a body of water, the assembly comprising an angled construction with one of the limbs of the construction being connected to an umbilical and pivotally connected to at least one foundation such as a mudmat, the method comprising the steps of:

lowering the umbilical termination assembly to said bed until the at least one foundation meets the bed; and allowing the assembly to rotate relative to the at least one foundation so that said one of the limbs is horizontally disposed, for example with a portion of the umbilical laying on said bed.

The step of lowering the umbilical termination assembly could be carried out using a lift line which is connected to the assembly or the at least one foundation or by using the umbilical to lower the assembly.

According to the present invention from yet another aspect, there is provided a method of installing an umbilical termination assembly for use with a subsea system, the method comprising lowering the assembly, with at least one foundation and an umbilical connected to the assembly, into a body of water so that said assembly sits on the bed of the body of water via said at least one foundation.

DETAILED DESCRIPTION OF THE INVENTION

Figure 1:
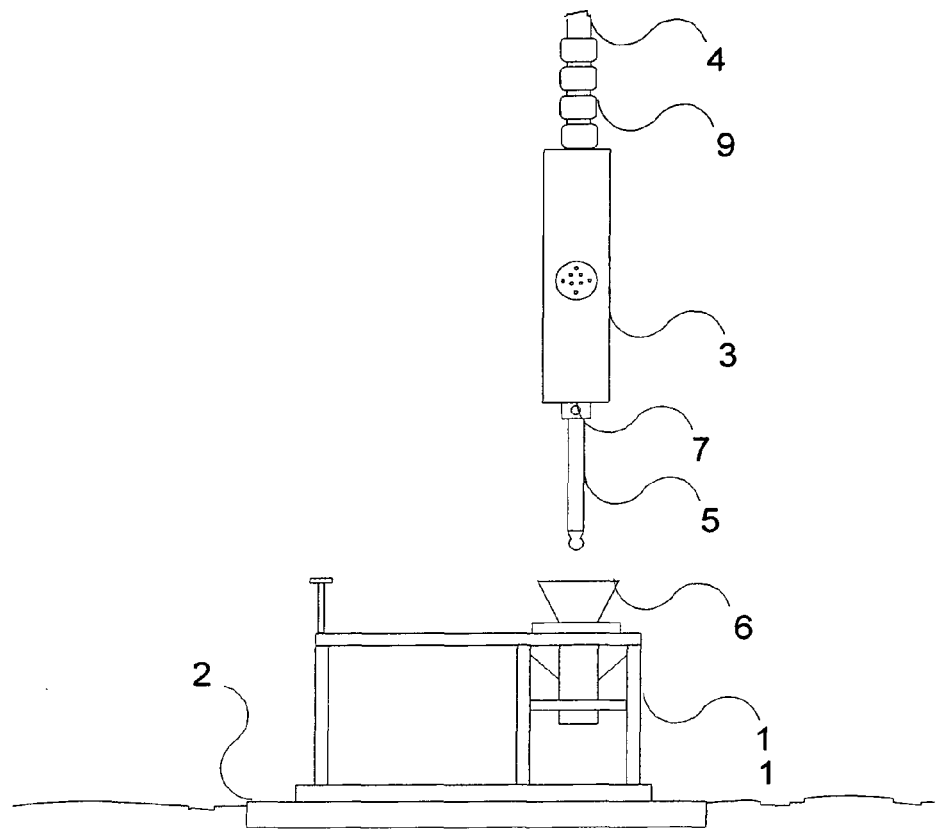
FIGS. 1a and 1b show diagrammatically a known process of installing a UTA.
Figure 1:
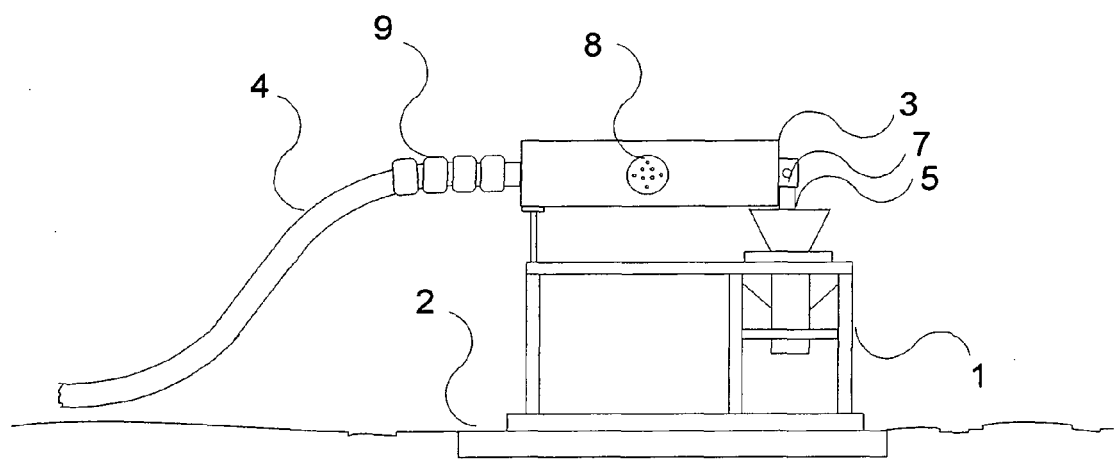
Figure 2:
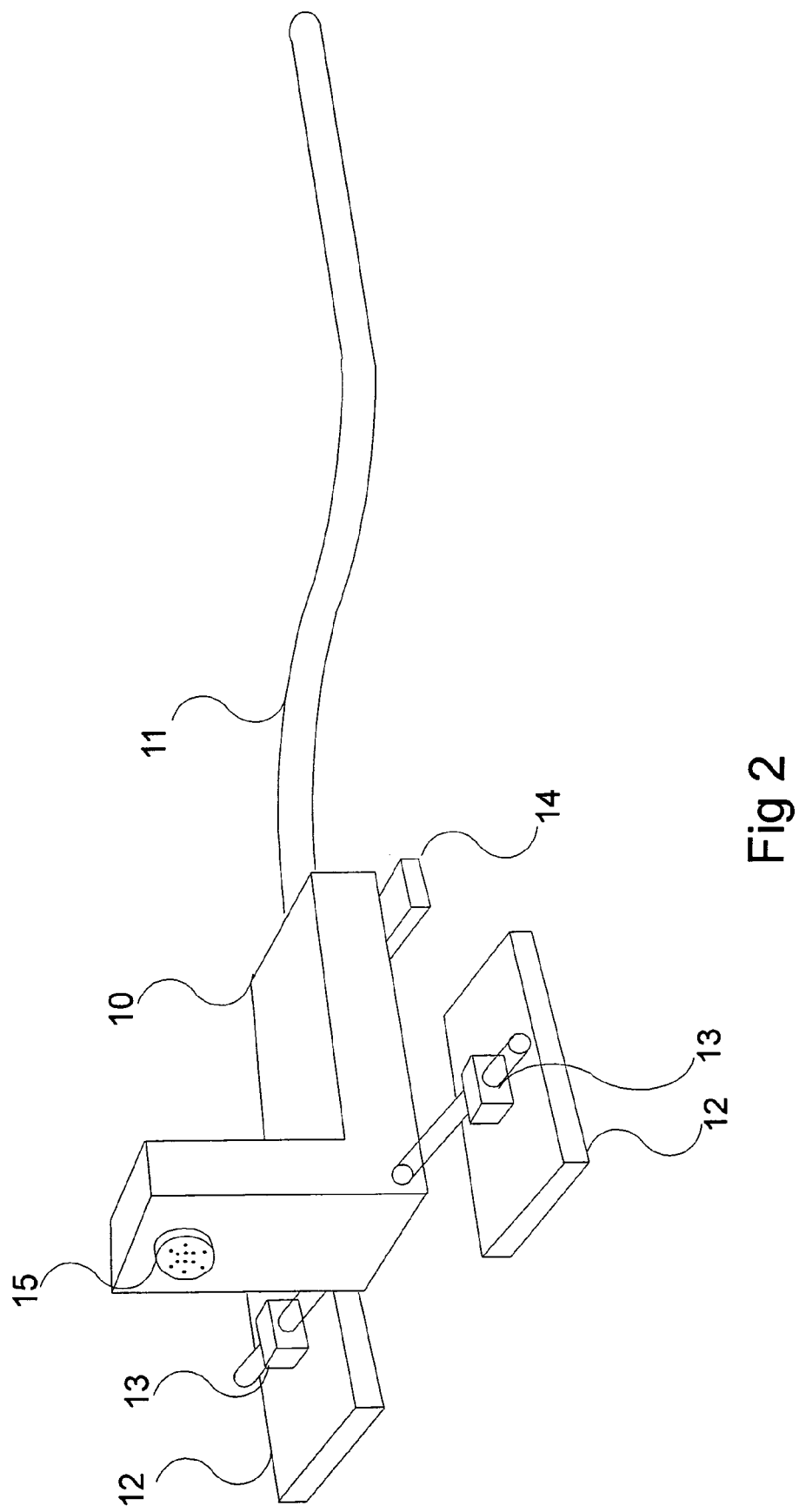
FIG. 2 is an isometric view of a UTA installed by a method according to an example of the present invention.

FIG. 2 is an isometric view showing a UTA 10 when installed on the sea bed by a method according to the invention. The UTA is a construction having limbs at a right-angle to each other, with one of the limbs being connected to an umbilical 11, such that the height of the umbilical 11 from the sea bed is typically less than one foot, thus obviating the need for bend restrictors. The assembly 10 is connected to two foundations provided by mudmats 12 via hinges 13 at an apex region of the construction comprising assembly 10, with an additional fixed foundation provided by a mudmat 14 at the rear of the assembly, i.e. on said one of the limbs and remote from the mudmats 12. A connector 15 on the other of the limbs provides for a link from the UTA 10 to a subsea system such as a well tree. If desired, there may be at least one further such connector on the assembly 10.

The umbilical 11 is for supplying from a surface platform or surface vessel for example, at least one of (for example) electric power, hydraulic power, control signals and chemicals to a subsea system such as a well tree of a subsea well, a subsea manifold or a subsea distribution unit. Accordingly, the umbilical 11 could simply be an electric cable.

Figure 3A:
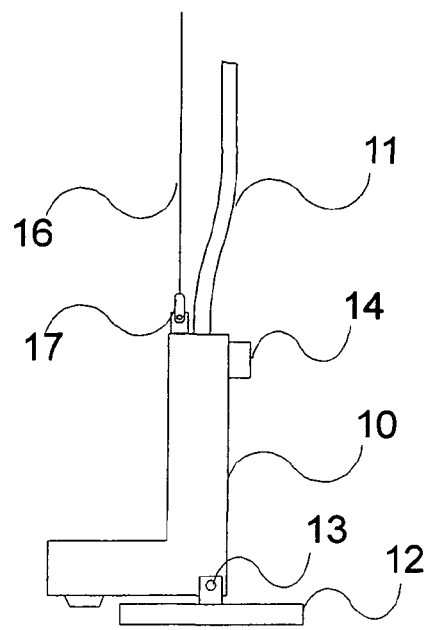
FIGS. 3a and 3b illustrate a method according to an example of the present invention.
Figure 3B:
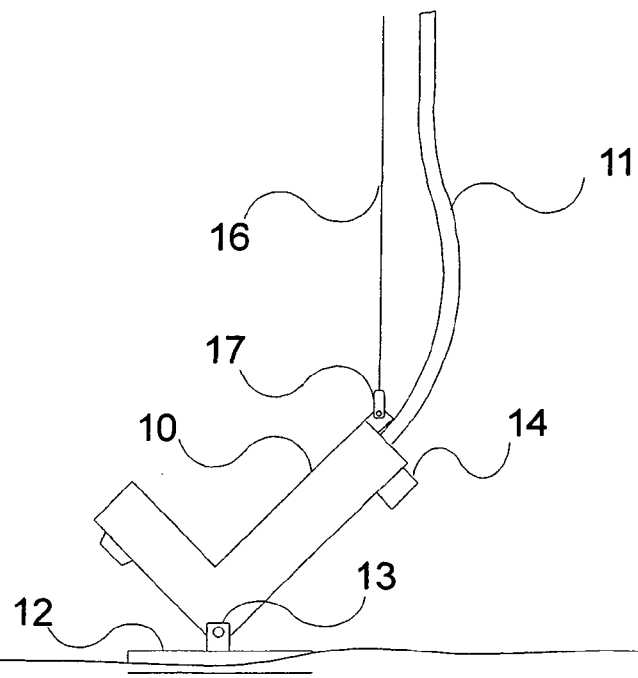

FIGS. 3a and 3b show a method for laying the UTA 10 on the sea bed. As shown in FIG. 3a, the UTA 10, with mudmats 12 and 14 connected, is lowered through a body of water to the sea bed from a lift line 16 from a surface platform or surface vessel for example, which line is connected to the UTA 10 by an ROV detachable shackle 17. Alternatively, if the umbilical 11 has sufficient strength, the UTA 10 may be lowered by the umbilical acting as the lift line. As shown in FIG. 3b, when the mudmat 12 reaches the sea bed, the UTA 10 rotates relative to the mudmats 12 at the hinges 13 until it achieves the installed position as shown in FIG. 2. The lift line 16, if utilized, is then detached by an ROV, leaving the umbilical 11 lying on the sea bed with its exit from the UTA being typically less than one foot in height from the sea bed and subjecting the umbilical 11 to minimal bending moment. Recovery of the UTA is effected by a reverse of the above procedure.

Figure 4A:
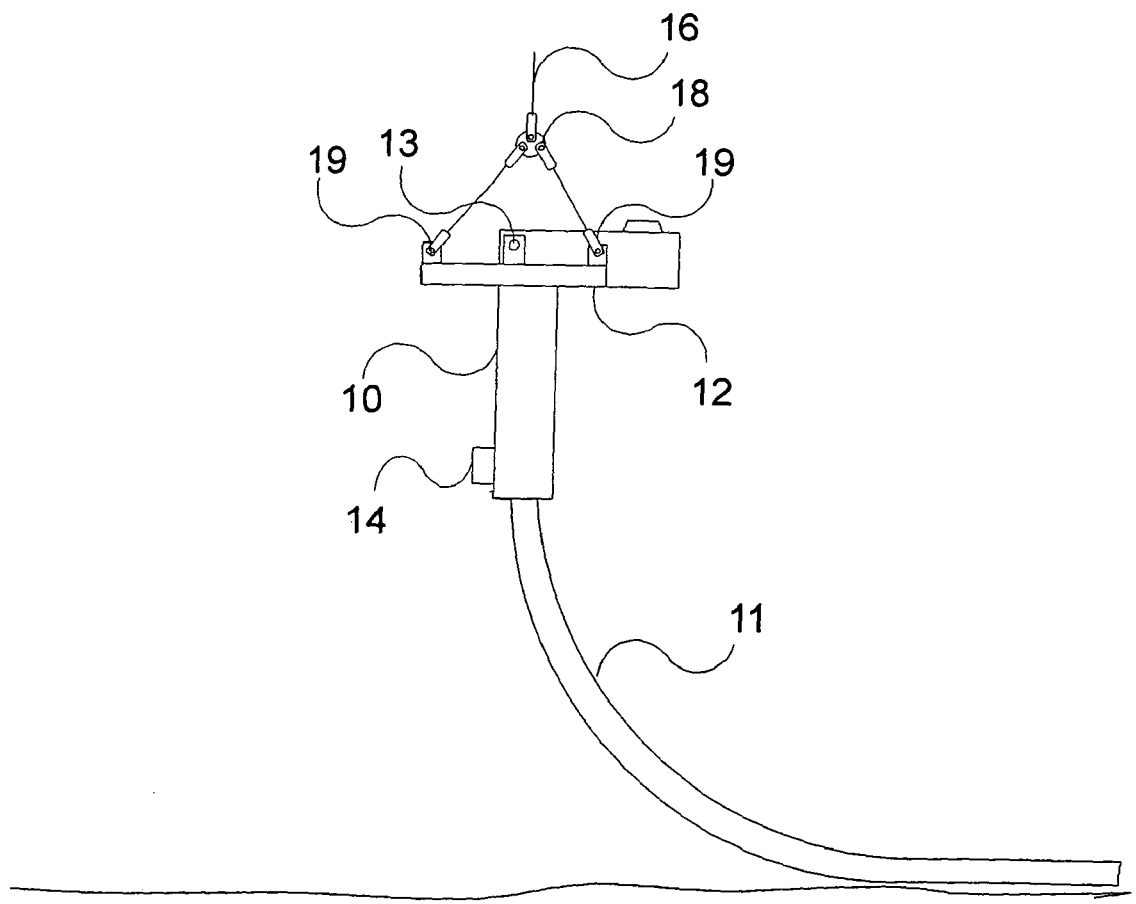
FIGS. 4a and 4b illustrate a method according to another example of the present invention.
Figure 4B:
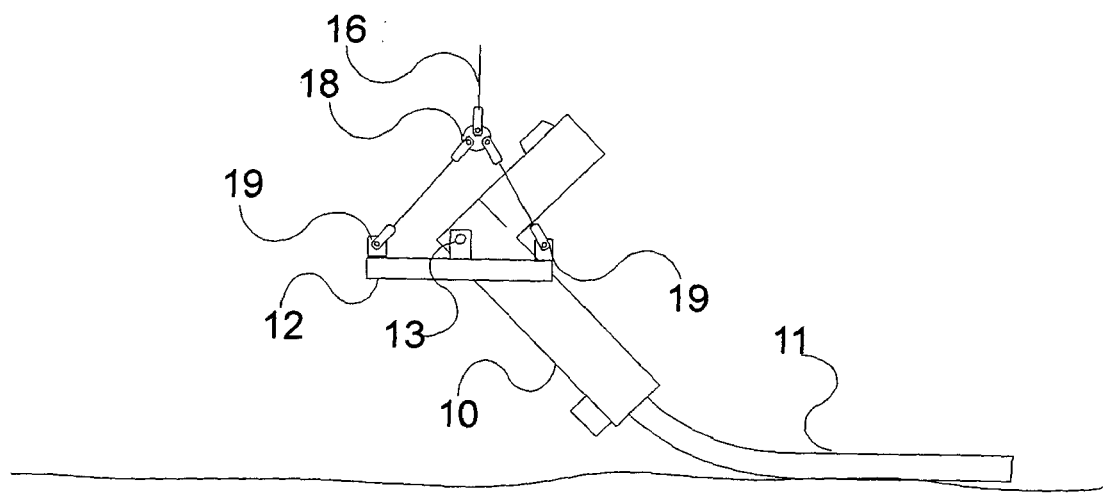

FIGS. 4a and 4b show an alternative method of laying the UTA 10, with the umbilical 11 pre-laid on the sea bed. As shown in FIG. 4a, the UTA 10 is lowered to the sea bed by lift line 16, which is connected via a sling assembly 18 to the mudmats 12 at shackle points 19. FIG. 4b shows the UTA 10 rotating about the hinges 13, as it is further lowered towards the sea bed, until said one of the limbs of the construction comprising the assembly 10 lies horizontal as in FIG. 2. Recovery of the UTA is again effected by a reverse of the above procedure.

ADVANTAGES OF THE INVENTION the umbilical exits close to the sea bed, typically one foot from it, thus reducing the bending moment on the UTA and umbilical loads to be resisted by the mudmats, reducing the size of each;

elimination or at least reduction of the quantity of umbilical bend restrictors required;

the built in hinges allow for deployment methods similar to that used for an existing Stab and Hinge Over (S&HO) UTA, without the need for an ROV operation to install the foundation and eliminates stabbing of the UTA into the foundation;

a variant could allow the ROV intervention panel to hinge down to lie on top of the termination area, reducing the transportation and storage size;

with appropriate slinging it would be possible to arrange the mudmats to travel vertically through the body of water with the mudmats only rotating to the horizontal position when close to the sea bed to allow a faster lowering time;

it is suitable for both the case where the umbilical is lowered with the UTA and the case where the umbilical is already laid on the sea bed;

the reduced mass of the assembly allows for a smaller foundation footprint which allows for a faster transit time through a body of water;

the orientation of mudmat 14 during overboarding and deployment allows for a faster lowering time.

While this invention has been described and shown in some of its forms, it should be apparent to those skilled in the art that it is not so limited but is susceptible to various changes without departing from the spirit and scope of the invention. In the drawings and specification, there have been disclosed illustrative embodiments of the invention and, although specific terms are employed, they are used in a generic and descriptive sense only and not for the purpose of limitation, the scope of the invention being set forth in the following claims.

The invention claimed is:

1. An underwater termination assembly for use with a subsea system, comprising a construction having first and second limbs, the second limb extending at transverse angle relative to the first limb, the construction being provided with at least one foundation, which construction may be lowered so that said one of the limbs sits on the bed of a body of water via said at least one foundation after it has been lowered to said bed;

wherein the construction is pivotally connected to said at least one foundation;

wherein said limbs meet at an apex region of the construction, at which the region the construction is pivotally connected to said at least one foundation;

wherein an umbilical is connected to said one of the limbs; and wherein said one of the limbs is provided with at least one further foundation, remote from said at least one foundation that lands on the bed, the foundations remaining on the bed and supporting the construction during normal use of the construction.

2. The assembly according to claim 1, wherein said angle is substantially a right-angle.

3. The assembly according to claim 1, including a lift line connected to said construction for lowering the construction into a body of water.

4. The assembly according to claim 1, wherein said construction may be lowered into a body of water by said umbilical.

5. The assembly according to claim 1, including a lift line connected to the at least one foundation via which lift line said construction may be lowered into a body of water.

6. The assembly of claim 1, wherein the construction is provided with at least one connector for providing a link to a subsea system.

7. The assembly of claim 6, wherein the other of said limbs is provided with at least one such connector.

8. A method of installing an underwater termination assembly for use with a subsea system, the assembly comprising a construction having first and second limbs rigidly joining each other at an apex region, the second limb extending from the first limb at a transverse angle relative to the first limb, at least one foundation pivotally connected to the structure at the apex region, the method comprising;

lowering the construction into a body of water, with an umbilical connected to the first limb, with the foundation oriented generally horizontally and the first limb oriented generally vertically;

landing said at least one foundation on a bed of the body of water;

rotating the construction relative to the at least one foundation to move the first limb to a generally horizontal position; and wherein the first limb is provided with at least one further, foundation, remote from said at least one foundation that lands on the bed, the foundations remaining on the bed and supporting the construction during normal use of the construction.

9. The method according to claim 8, wherein said angle is substantially a right-angle.

10. The method according to claim 8, wherein said construction is lowered into the body of water via a lift line attached to the first limb.

11. The method according to claim 8, wherein said construction is lowered into the body of water via said umbilical.

12. The method according to claim 8, wherein said construction is lowered into the body of water via a lift line connected to the at least one foundation.

13. An umbilical termination assembly, comprising:

a generally L-shaped construction having a first limb with a distal end, the first limb having a longitudinal axis passing through the distal end, the distal end being connected to an umbilical that extends away from distal end along the longitudinal axis;

the construction having a second limb rigidly joining the first limb opposite the distal end and extending in a direction transverse to the longitudinal axis;

a foundation having a lower side for landing on a sea floor, the foundation being pivotally mounted to the construction at a junction between the first and second limbs to allow the construction to rotate as the foundation lands on the sea floor, such that the first limb moves from a generally vertical position to a generally horizontal position while the foundation remains stationary on the seafloor; and the foundation remaining on the sea floor and supporting the construction during normal use of the construction.

14. The assembly of claim 13, further comprising:

an additional foundation for landing on the seafloor on a lower side of the first limb at the distal end.

15. The assembly of claim 13, further comprising a connector on the second limb for linking the umbilical to a subsea system, the connector being spaced along the second limb from the junction of the first and second limbs, the connector facing in a direction generally parallel to the axis but in an opposite direction from the distal end of the first limb.

* * * * *